United States Patent
Lee et al.

(10) Patent No.: US 9,715,133 B2
(45) Date of Patent: Jul. 25, 2017

(54) LIQUID CRYSTAL DISPLAY AND DRIVING METHOD THEREOF

(71) Applicant: SAMSUNG DISPLAY CO., LTD., Yongin, Gyeonggi-do (KR)

(72) Inventors: Young-Wook Lee, Suwon-si (KR); Hwa-Yeul Oh, Seoul (KR); Pil-Sang Yun, Seoul (KR); Je-Hyeong Park, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 195 days.

(21) Appl. No.: 14/512,354

(22) Filed: Oct. 10, 2014

(65) Prior Publication Data

US 2015/0029426 A1   Jan. 29, 2015

Related U.S. Application Data

(62) Division of application No. 12/421,618, filed on Apr. 9, 2009, now Pat. No. 8,884,861.

(30) Foreign Application Priority Data

Nov. 17, 2008   (KR) .................. 10-2008-0114096

(51) Int. Cl.
*G09G 3/36* (2006.01)
*G02F 1/133* (2006.01)
(Continued)

(52) U.S. Cl.
CPC ...... *G02F 1/13306* (2013.01); *G02F 1/13624* (2013.01); *G02F 1/136213* (2013.01);
(Continued)

(58) Field of Classification Search
CPC ... G09G 2300/0443; G09G 2300/0809; G09G 2300/0876
See application file for complete search history.

(56) References Cited

U.S. PATENT DOCUMENTS

2005/0036091 A1* 2/2005 Song ................. G02F 1/133707
349/129
2006/0187368 A1   8/2006 Kim et al.
(Continued)

FOREIGN PATENT DOCUMENTS

KR   10-2006-0084014 A   7/2006
KR   10-2007-0063168 A   6/2007
(Continued)

*Primary Examiner* — Dennis Joseph
(74) *Attorney, Agent, or Firm* — Innovation Counsel LLP

(57) ABSTRACT

The present invention relates to a liquid crystal display and a driving method thereof. The liquid crystal display of the present invention includes a pixel electrode including: a first subpixel electrode, a second subpixel electrode, and a third subpixel electrode electrically separated from each other; a first thin film transistor connected to the first subpixel electrode; a second thin film transistor connected to the second subpixel electrode; a third thin film transistor connected to the third subpixel electrode; a fourth thin film transistor connected to the second subpixel electrode and the third subpixel electrode; a first gate line connected to the first to third thin film transistors; a second gate line connected to the fourth thin film transistor; a data line connected to the first and second thin film transistors; and a storage electrode line connected to the third thin film transistor.

10 Claims, 7 Drawing Sheets

(51) Int. Cl.
*G02F 1/1362* (2006.01)
*G02F 1/1343* (2006.01)

(52) U.S. Cl.
CPC ............. *G09G 3/3659* (2013.01); *G02F 2001/134345* (2013.01); *G09G 2300/0443* (2013.01); *G09G 2300/0447* (2013.01); *G09G 2300/0809* (2013.01); *G09G 2300/0876* (2013.01); *G09G 2320/028* (2013.01)

(56) References Cited

U.S. PATENT DOCUMENTS

| | | |
|---|---|---|
| 2006/0215066 A1 | 9/2006 | Ueda et al. |
| 2006/0262262 A1 | 11/2006 | Kim et al. |
| 2006/0268186 A1 | 11/2006 | Kamada et al. |
| 2008/0165311 A1 | 7/2008 | Abileah et al. |
| 2009/0190052 A1 | 7/2009 | Jung et al. |

FOREIGN PATENT DOCUMENTS

| | | |
|---|---|---|
| KR | 10-2007-0119848 A | 12/2007 |
| KR | 10-2008-0097793 A | 11/2008 |

\* cited by examiner

LIQUID CRYSTAL DISPLAY AND DRIVING METHOD THEREOF

CROSS-REFERENCE TO RELATED APPLICATION

This is a divisional patent application of U.S. patent application Ser. No. 12/421,618, filed on Apr. 9, 2009, which application claims priority to and the benefit of Korean Patent Application No. 10-2008-0114096 filed in the Korean Intellectual Property Office on Nov. 17, 2008, the entire contents of which are incorporated herein by reference.

BACKGROUND OF THE INVENTION (a) Field of the Invention

The present invention relates to a liquid crystal display and a driving method thereof.

(b) Description of the Related Art

A liquid crystal display (hereinafter referred to as an LCD) is one of the most widely used flat panel displays. The LCD includes two display panels provided with electric field generating electrodes, such as pixel electrodes and a common electrode, and a liquid crystal layer interposed between the two display panels. In the LCD, voltages are applied to the electric field generating electrodes to generate an electric field in the liquid crystal layer. Due to the generated electric field, liquid crystal molecules of the liquid crystal layer are aligned and polarization of incident light is controlled, thereby displaying images.

The LCD also includes switching elements connected to the respective pixel electrodes, and a plurality of signal lines such as gate lines and data lines for controlling the switching elements and applying voltages to the pixel electrodes.

Among these LCDs, a vertical alignment mode LCD, which arranges major axes of liquid crystal molecules so as to be vertical to the display panel in a state in which an electric field is not applied, has been widely used due to its high contrast ratio and wide reference viewing angle. Here, the reference viewing angle implies a viewing angle that is 1:10 in contrast ratio, or a critical angle of gray-to-gray luminance reversion.

In order to approximate side visibility to front visibility in the vertical alignment mode LCD, a method of causing a difference in transmittance by dividing one pixel into two subpixels and applying different voltages to the two subpixels has been suggested.

The above information disclosed in this Background section is only for enhancement of understanding of the background of the invention and therefore it may contain information that does not form the prior art that is already known in this country to a person of ordinary skill in the art.

SUMMARY OF THE INVENTION

However, this method does not still solve the problem of the side visibility, and accordingly, the present invention approximates the side visibility to the front visibility and provides natural display on the side.

A liquid crystal display according to the present invention includes: a pixel electrode including a first subpixel electrode, a second subpixel electrode, and a third subpixel electrode electrically separated from each other; a first thin film transistor connected to the first subpixel electrode; a second thin film transistor connected to the second subpixel electrode; a third thin film transistor connected to the third subpixel electrode; a fourth thin film transistor connected to the second subpixel electrode and the third subpixel electrode; a first gate line connected to the first to third thin film transistors; a second gate line connected to the fourth thin film transistor; a data line connected to the first and second thin film transistors; and a storage electrode line connected to the third thin film transistor.

A voltage ("a first subpixel voltage") of the first subpixel electrode may be higher than a voltage of the second subpixel electrode voltage ("a second subpixel voltage") with respect to a predetermined voltage, and the voltage of the second subpixel electrode may be higher than a voltage ("a third subpixel voltage") of the third subpixel electrode after voltage application for the first to third subpixel electrodes is completed.

The storage electrode line may overlap the first to third subpixel electrodes.

The first gate line and the second gate line may be adjacent to each other.

The gate electrodes of the first and second thin film transistors may be connected to each other, and the source electrodes of the first and second thin film transistors are connected to each other.

A connecting member connecting the source electrode of the third thin film transistor and the storage electrode line may be further included.

The storage electrode line may be applied with a common voltage.

A liquid crystal display according to another exemplary embodiment of the present invention includes: first, second, and third liquid crystal capacitors; a first switching element connected to the first liquid crystal capacitor; a second switching element connected to the second liquid crystal capacitor; a third switching element connected to the third liquid crystal capacitor; and a fourth switching element connected to the second and third liquid crystal capacitors, wherein the charging voltages of the first to third liquid crystal capacitors are different from each other.

A first gate line connected to the first to third switching elements, a second gate line connected to the fourth switching element, a data line connected to the first and second switching elements, and a storage electrode line connected to the third switching element may be further included.

The fourth switching element may be turned on after the first to third switching elements are turned on.

A driving method of a liquid crystal display including first to third liquid crystal capacitors according to another exemplary embodiment of the present invention includes: charging the first and second liquid crystal capacitors with the same data voltage; charging a common voltage to the third liquid crystal capacitor; and decreasing a charging voltage of the second liquid crystal capacitor and increasing a charging voltage of the third liquid crystal capacitor.

The charging voltage of the first liquid crystal capacitor may be higher than the charging voltage of the second liquid crystal capacitor, and the charging voltage of the second liquid crystal capacitor may be higher than the charging voltage of the third liquid crystal capacitor after decreasing a charging voltage of the second liquid crystal capacitor and increasing a charging voltage of the third liquid crystal capacitor.

The charging of the first and second liquid crystal capacitors with the same data voltage and the charging of the common voltage to the third liquid crystal capacitor may be simultaneously executed.

According to the present invention, the problem of the side visibility of the liquid crystal display may be effectively resolved.

Figure 1:
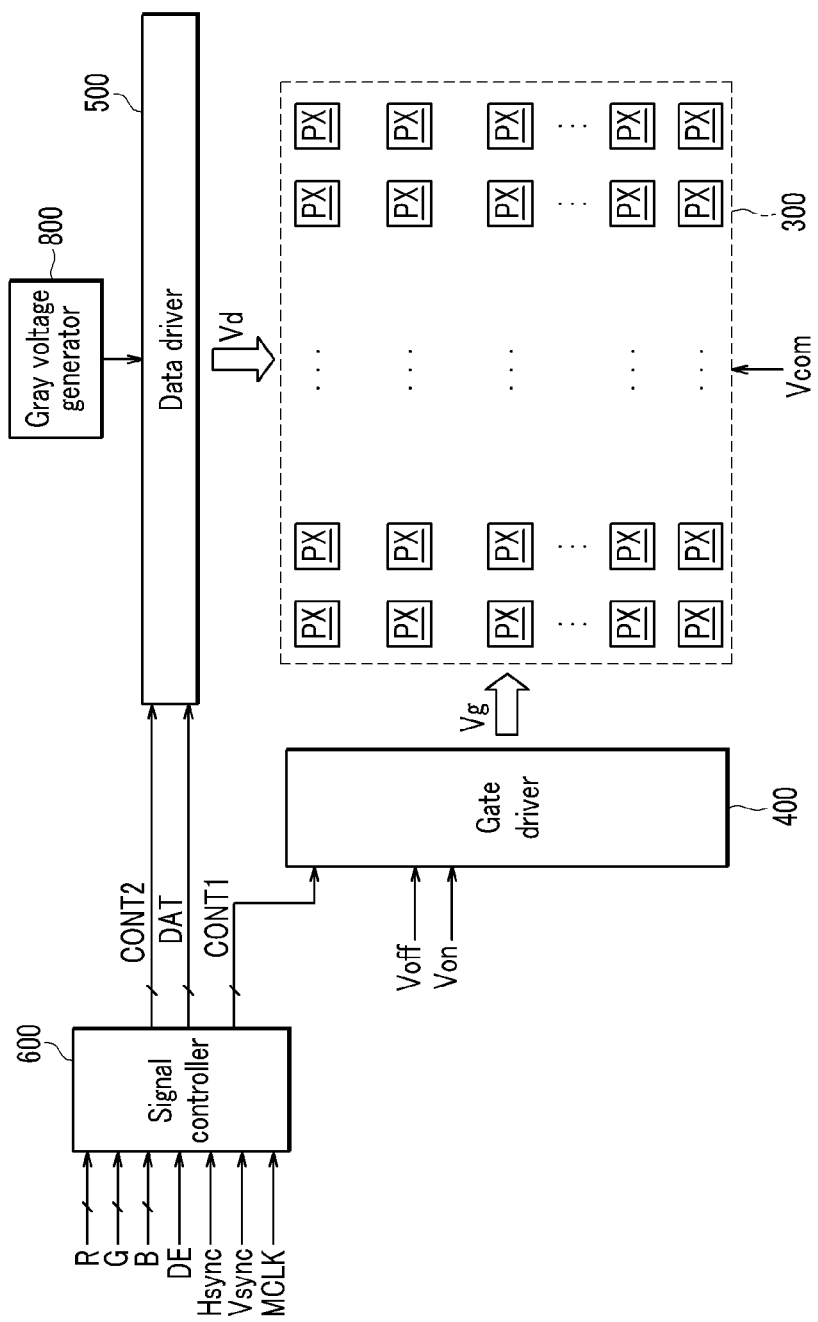
FIG. 1 is a block diagram of a liquid crystal display according to an exemplary embodiment of the present invention.

<Description of Reference Numerals Indicating Primary Elements in the Drawings>

| | |
|---|---|
| 11, 21: | alignment layer |
| 12, 22: | polarizer |
| 81, 82: | contact assistants |
| 83: | connecting member |
| 110, 210: | substrate |
| 121: | gate line |
| 124a-d: | gate electrode |
| 131: | storage electrode line |
| 137: | storage electrode |
| 140: | gate insulating layer |
| 154a-d: | semiconductor |
| 163c, 165c: | ohmic contact |
| 171: | data line |
| 173a-d: | source electrode |
| 175a-d: | drain electrode |
| 180: | passivation layer |
| 181, 182, 185a-d, 186, 188: | contact hole |
| 191, 191a, 191b, 191c: | pixel electrode |
| 220: | light blocking member |
| 230: | color filter |
| 250: | overcoat |
| 270: | common electrode |

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

An LCD according to one exemplary embodiment of the present invention will be described more fully hereinafter with reference to drawings.

Figure 2:
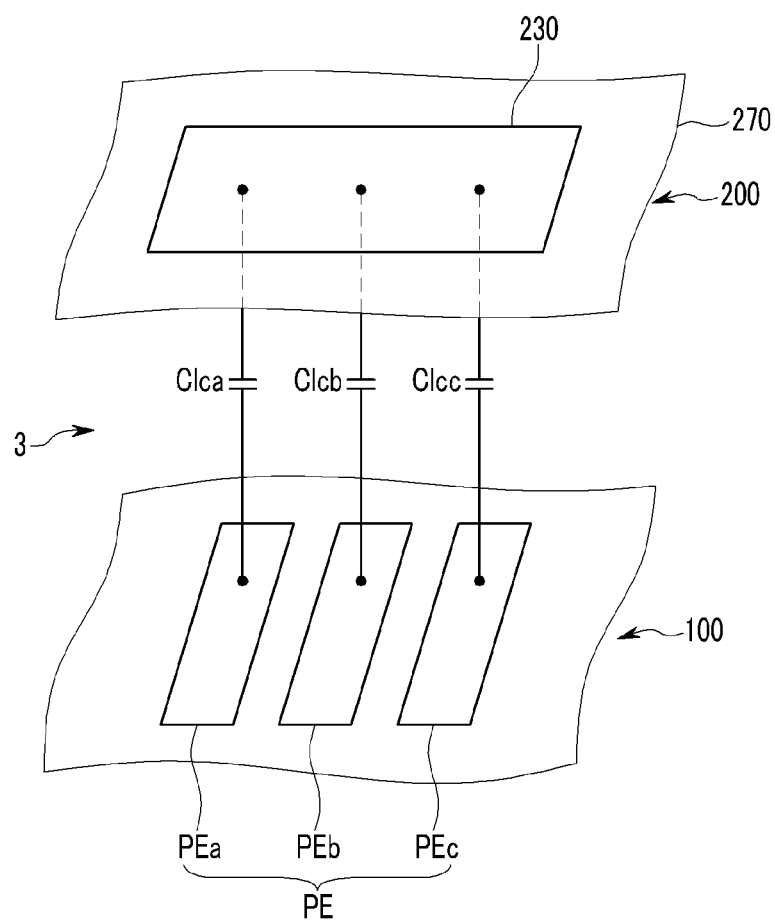
FIG. 2 is an equivalent circuit diagram of three subpixels along with a structure of a liquid crystal display according to an exemplary embodiment of the present invention.

FIG. 1 is a block diagram of a liquid crystal display according to an exemplary embodiment of the present invention, and FIG. 2 is an equivalent circuit diagram of three subpixels along with a structure of a liquid crystal display according to an exemplary embodiment of the present invention.

As shown in FIG. 1, an LCD according to one exemplary embodiment of the present invention includes a liquid crystal panel assembly 300, a gate driver 400, a data driver 500, a storage electrode driver 700, a gray voltage generator 800, and a signal controller 600.

The liquid crystal panel assembly 300, in a view of an equivalent circuit, includes a plurality of signal lines $GL_i$, $GL_{i+1}$, and SL, and a plurality of pixels PX that are connected thereto and arranged approximately in the form of a matrix. Meanwhile, as seen from the structure of FIG. 2, the liquid crystal panel assembly 300 includes a lower panel 100 and an upper panel 200 facing each other, and a liquid crystal layer 3 interposed therebetween.

The signal lines include a plurality of gate lines $GL_i$ and $GL_{i+1}$ transmitting a gate signal (referred to as "scanning signal"), a plurality of data lines DL transmitting a data voltage Vd, and a plurality of storage electrode lines SL. The gate lines $GL_i$ and $GL_{i+1}$ and the storage electrode lines SL extend in an approximate row direction and run substantially parallel to one another, and the data lines DL extend in an approximate column direction and run substantially parallel to each other.

Each of the pixels PX includes three subpixels, and each subpixel includes liquid crystal capacitors Clca, Clcb, and Clcc. Each of the pixels PX include switching elements Qa, Qb, Qc, and Qd connected to the gate lines $GL_i$ and $GL_{i+1}$, the data line DL, and the liquid crystal capacitors Clca, Clcb, and Clcc.

The liquid crystal capacitors Clca, Clcb, and Clcc include subpixel electrodes PEa/PEb/PEc of the lower display panel 100 and a common electrode 270 of the upper display panel 200 as two terminals, respectively, and the liquid crystal layer 3 between the subpixel electrodes PEa/PEb/PEc and the common electrode 270 serves as a dielectric material. The subpixel electrodes PEa/PEb/PEc are separated from each other and form one pixel electrode PE. The common electrode 270 is formed on the entire surface of the upper display panel 200, and a common voltage Vcom is applied to the common electrode 270. The liquid crystal layer 3 has negative dielectric anisotropy, and liquid crystal molecules of the liquid crystal layer 3 may be aligned such that their major axes are perpendicular to the surfaces of the two display panels when an electric field is not applied. Differently from FIG. 2, the common electrode 270 may be formed on the lower display panel 100, and one at least of the two electrodes PE and 270 may have a linear shape or a bar shape.

Meanwhile, in order to realize color display, each pixel PX uniquely displays one of primary colors (spatial division) or each pixel PX temporally and alternately displays primary colors (temporal division). Then, the primary colors are spatially or temporally synthesized, and thus a desired color is recognized. Examples of the primary colors may include three primary colors of red, green, and blue. FIG. 2 shows an example of the spatial division. In FIG. 2, each pixel PX has a color filter 230 that represents one of the primary colors in a region of the upper panel 200. Unlike FIG. 2, the color filter 230 may be formed above or below the subpixel electrodes PEa, PEb, or PEc of the lower display panel 100.

Polarizers (not shown) for providing light polarization are provided on outer surfaces of the display panels 100 and 200, and the polarization axis of two polarizers may be crossed. One of two polarizers may be omitted in the case of a reflective liquid crystal display. In the case of the crossed polarizers, the light incident to the liquid crystal layer 3 is blocked when an electric field is not applied.

Referring again to FIG. 1, the gray voltage generator 800 generates all gray voltages or a predetermined number of the gray voltages (or reference gray voltages) related to transmittance of the pixels PX. The (reference) gray voltages may include one set having a positive value for a common voltage Vcom, and another set having a negative value.

The gate driver 400 is connected to the gate line $GL_i$ and $GL_{i+1}$ of the liquid crystal panel assembly 300, and applies gate signals obtained by combining a gate-on voltage Von and a gate-off voltage Voff to the gate lines $GL_i$ and $GL_{i+1}$.

The data driver 500 is connected to the data lines DL of the liquid crystal panel assembly 300, and selects the data signals from the gray voltage generator 800 to apply them to the data lines DL as data voltages. However, when the gray voltage generator 800 does not supply a voltage for all grays but supplies only a predetermined number of reference gray voltages, the data driver 500 divides the reference gray voltages to select image data signals.

The signal controller 600 controls the gate driver 400 and the data driver 500.

Each of the drivers 400, 500, 600, and 800 may be directly mounted on the liquid crystal panel assembly 300 in the form of at least one IC chip, may be mounted on a flexible printed circuit film (not shown) and then mounted on the liquid crystal panel assembly 300 in the form of a tape carrier package (TCP), or may be mounted on a separate printed circuit board (not shown). Alternatively, the drivers 400, 500, 600, and 800 may be integrated with the liquid crystal panel assembly 300 together with, for example, the signal lines $GL_i$, $GL_{i+1}$, and DL and the thin film transistor switching elements Qa, Qb, and Qc. The drivers 400, 500, 600, and 800 may be integrated into a single chip. In this case, at least one of the drivers or at least one circuit forming the drivers may be arranged outside the single chip.

A liquid crystal panel assembly according to an exemplary embodiment of the present invention will now be described in detail with reference to FIG. 3 to FIG. 7.

Figure 3:
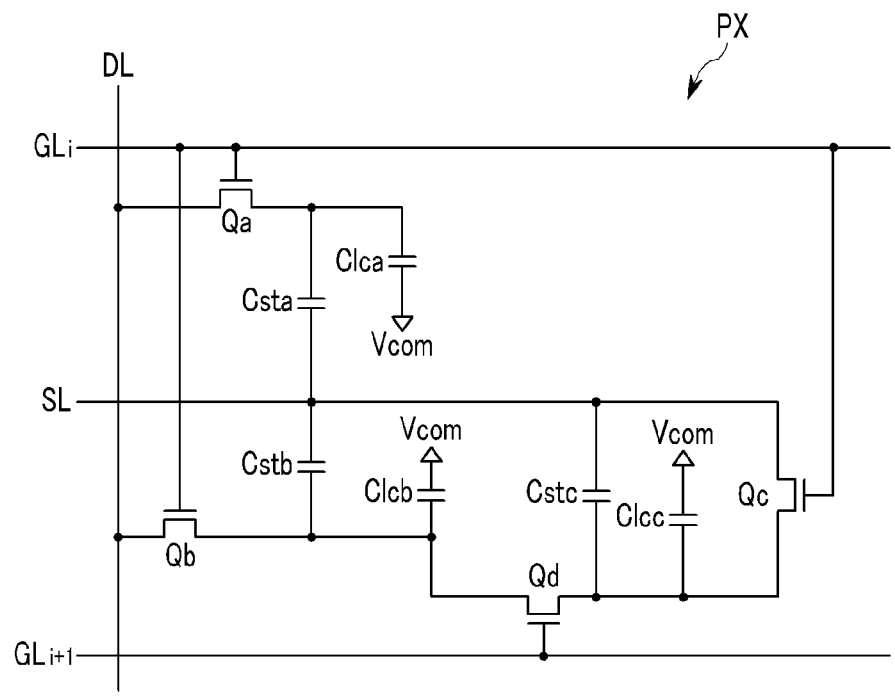
FIG. 3 is an equivalent circuit diagram of one pixel of a liquid crystal panel assembly according to an exemplary embodiment of the present invention.

FIG. 3 is an equivalent circuit diagram of one pixel of a liquid crystal panel assembly according to an exemplary embodiment of the present invention.

Referring to FIG. 3, the liquid crystal panel assembly according to the present exemplary embodiment includes signal lines of neighboring first and second gate lines $GL_i$ and $GL_{i+1}$, a data line DL, and a storage electrode line SL, and a plurality of pixels PX that are connected to the signal lines.

The pixel PX includes the first, second, third, and fourth switching elements Qa, Qb, Qc, and Qd, the first, second, and third liquid crystal capacitors Clca, Clcb, and Clcc, and the first, second, and third storage capacitors Csta, Cstb, and Cstc.

The first and the second switching elements Qa and Qb are respectively connected to the first gate line $GL_i$ and the data line DL, the third switching element Qc is connected to the first gate line $GL_i$, and the fourth switching element Qd is connected to the second gate line $GL_{i+1}$.

The first and second switching elements Qa and Qb are three terminal elements such as thin film transistors provided in the lower panel 100, the control terminals of which are connected to one of the first gates line $GL_i$, the input terminals of which are connected to the data line DL, and the output terminals of which are respectively connected to the first/second liquid crystal capacitors Clca/Clcb.

The third switching element Qc is also a three terminal element such as a thin film transistor provided in the lower panel 100, the control terminal of which is connected to one of the first gate line $GL_i$, the input terminal of which is connected to the storage electrode line SL, and the output terminal of which is connected to the third liquid crystal capacitor Clcc.

The fourth switching element Qd is also a three terminal element such as a thin film transistor provided in the lower panel 100, the control terminal of which is connected to one of the second gate line $GL_{i+1}$, the input terminal of which is connected to the second liquid crystal capacitor Clcb, and the output terminal of which is connected to the third liquid crystal capacitor Clcc.

The first/second/third storage capacitors Csta/Cstb/Cstc are connected to the first/second/third switching elements Qa/Qb/Qc, and the storage electrode line SL, and are formed by overlapping the storage electrode line SL and the first/second/third subpixel electrodes PEa/PEb/PEc via the insulator therebetween.

Now, the liquid crystal panel assembly shown in FIG. 3 will be described in detail with reference to FIG. 4 to FIG. 6.

Figure 4:
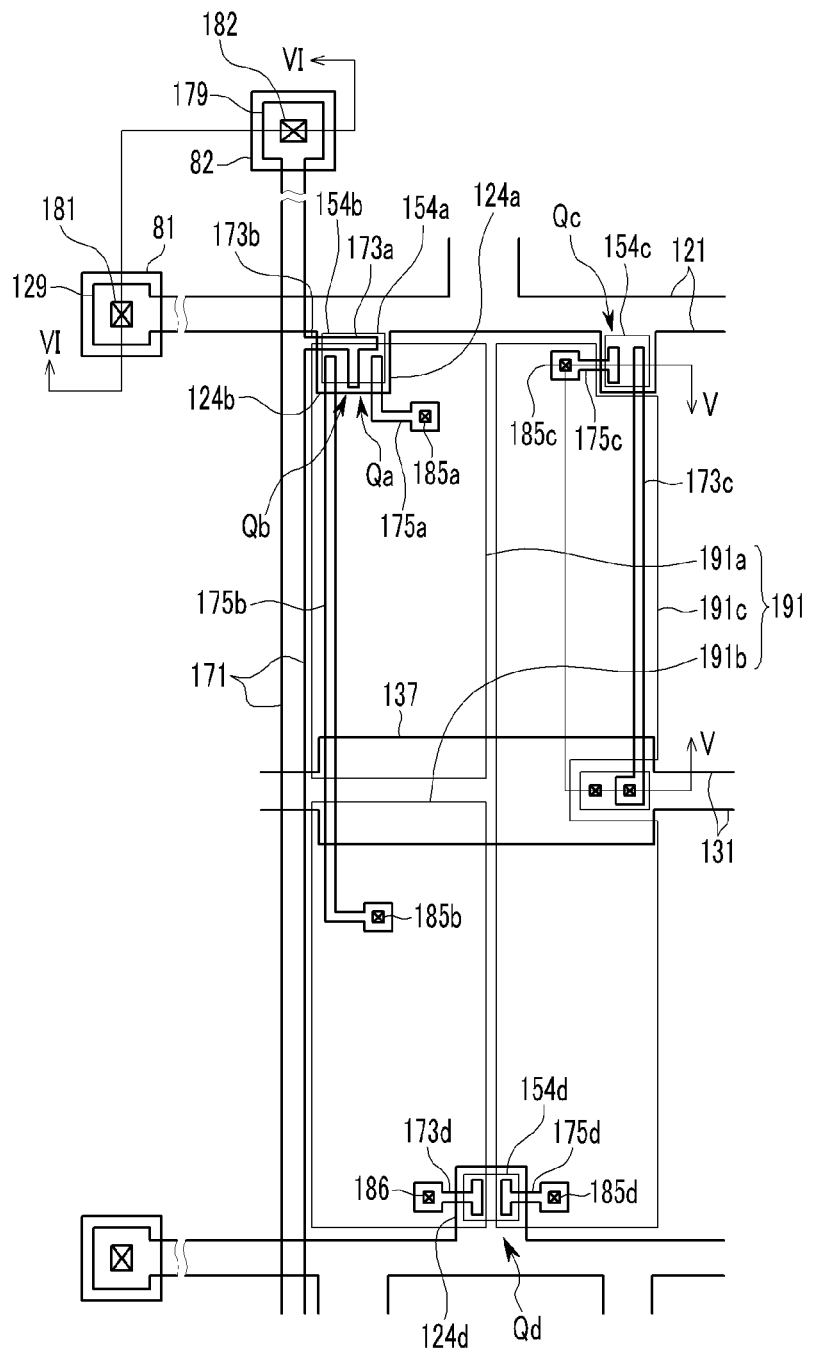
FIG. 4 is a layout view of a liquid crystal panel assembly according to an exemplary embodiment of the present invention.
Figure 5:
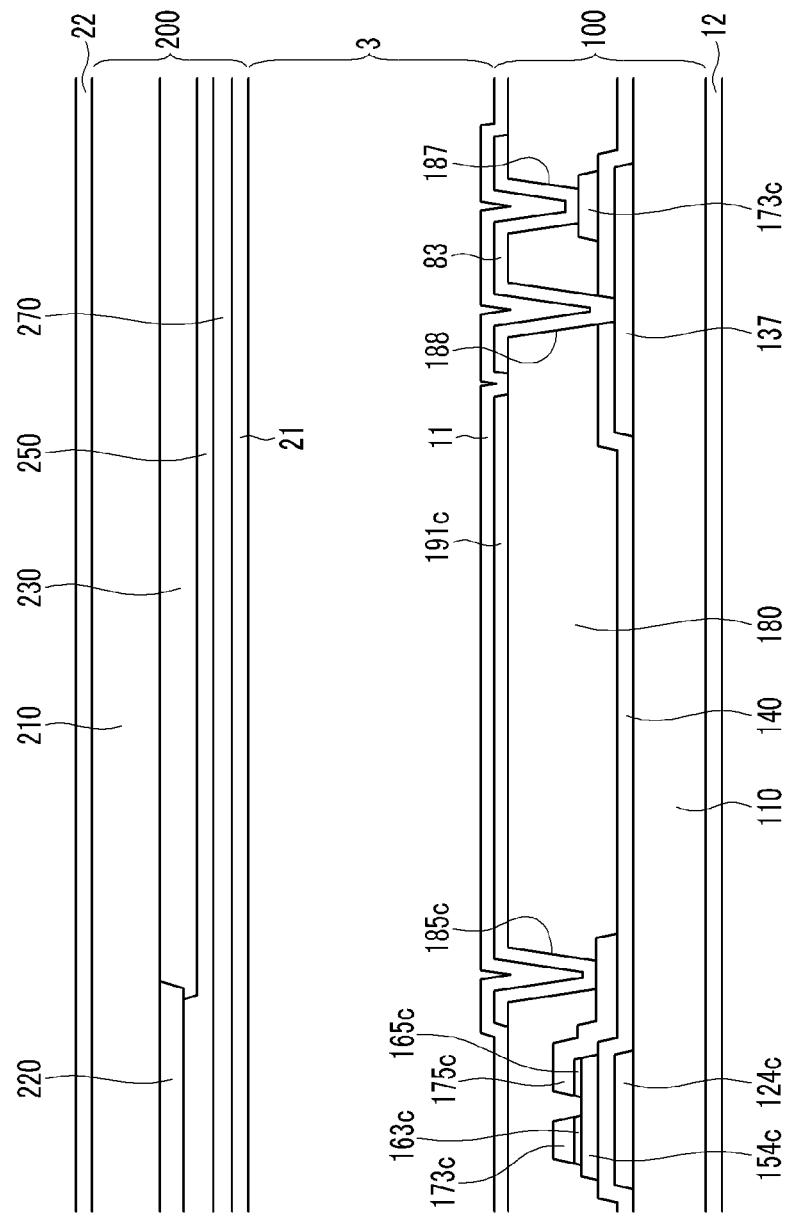
FIG. 5 and FIG. 6 are cross-sectional views of the liquid crystal panel assembly shown in FIG. 4 taken along the lines V-V and VI-VI, respectively.
Figure 6:
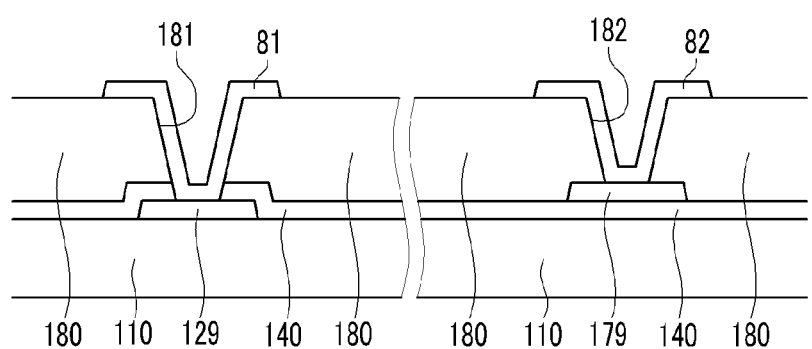

FIG. 4 is a layout view of a liquid crystal panel assembly according to an exemplary embodiment of the present invention, and FIG. 5 and FIG. 6 are cross-sectional views of the liquid crystal panel assembly shown in FIG. 4 taken along the lines V-V and VI-VI, respectively.

Referring to FIG. 4 to FIG. 6, a liquid crystal panel assembly according to an exemplary embodiment of the present invention includes a lower panel 100 and a upper panel 200 facing each other, a liquid crystal layer 3 disposed between the two display panels 100 and 200, and a pair of polarizers 12 and 22 respectively attached on the outside surfaces of the display panels 100 and 200.

Firstly, the lower panel 100 will be described.

A plurality of gate conductors including gate lines 121 and storage lines 131 are formed on an insulation substrate 110. The gate lines 121 include first, second, third, and fourth gate electrodes 124a, 124b, 124c, and 124d, and end portions 129. The first and second gate electrodes 124a and 124b are connected to each other.

The storage electrode line 131 transmits a predetermined voltage, for example a common voltage Vcom, and includes an expansion 137 expanding upward and downward with a wide area.

A gate insulating layer 140 is formed on the gate conductors 121 and 131. First, second, third, and fourth semiconductor islands 154a, 154b, 154c, and 154d are formed on the gate insulating layer 140. The first and second semiconductor islands 154a and 154b are connected to each other.

First ohmic contacts (not shown), second ohmic contacts (not shown), third ohmic contacts 163c and 165c, and fourth ohmic contacts (not shown) are respectively formed on the semiconductor islands 154a, 154b, 154c, and 154d.

A plurality of data lines 171, a plurality of first and second drain electrodes 175a and 175b, and first, second, third, and fourth electrode members 173c, 175c, 173d, and 175d are formed on the ohmic contacts 163c and 165c, and the gate insulating layer 140.

The data lines 171 transmit data voltages and extend in a longitudinal direction, thereby intersecting the gate lines 121. Each data line 171 includes a plurality of first and second source electrodes 173a and 173b, and an end portion 179 having a large area for contact with another layer or an external driving circuit. The first and second source electrodes 173a and 173b are connected to each other.

The first and second drain electrodes 175a and 175b are separated from each other, and are also separated from the data lines 171.

The first electrode member 173c forms the third source electrode, the second electrode member 175c forms the third drain electrode, the third electrode member 173d forms the fourth source electrode, and the fourth electrode member 175d forms the fourth drain electrode.

The first, second, third, and fourth drain electrodes 175a, 175b, 175c, and 175d include one end portion with a wide area and the other end portion as a bar type. The bar end portions of the first/second/third/fourth drain electrodes 175a/175b/175c/175d face the first/second/third/fourth source electrodes 173a/173b/173c/173d.

The first/second/third/fourth gate electrodes 124a/124b/124c/124d, the first/second/third/fourth source electrodes 173a/173b/173c/173d, and the first/second/third/fourth drain electrodes 175a/175b/175c/175d form the first/second/third/fourth thin film transistors (TFT) Qa/Qb/Qc/Qd along with the first/second/third/fourth semiconductor islands 154a/154b/154c/154d, and the channels of the thin film transistors are respectively formed in the semiconductor islands 154a/154b/154c/154d between the source electrodes 173a/173b/173c/173d and the drain electrodes 175a/175b/175c/175d.

A passivation layer 180 is formed on the data conductors 171, 175a, 175b, 173c, 175c, 173d, and 175d and the exposed semiconductors 154a, 154b, 154c, and 154d.

The passivation layer 180 has a plurality of contact holes 182, 185a, 185b, 185c, 185d, 186, and 188 exposing the end portions 179 of the data lines 171, the wide end portions of the first to fourth drain electrodes 175a-d, the end portions of the fourth source electrode 173d, and portions of the storage electrodes 137. The passivation layer 180 and the gate insulating layer 140 have a plurality of contact holes 181 and 187 exposing the end portions 129 of the gate lines 121 and the end portions of the third source electrodes 173c.

A plurality of pixel electrodes 191 including first, second, and third subpixel electrodes 191a, 191b, and 191c, and contact assistants 81 and 82 and connecting members 83 are formed on the passivation layer 180. The pixel electrodes 191 and the contact assistants 81 and 82 are formed of a transparent material such as ITO and IZO.

The first and second subpixel electrodes 191a and 191b are adjacent to each other in the column direction, and the third subpixel electrode 191c is adjacent to the first and second subpixel electrodes 191a and 191b in the row direction. However, the arrangement of the first to third subpixel electrodes 191a-c may be changed in various ways, and the areas thereof may be variously changed.

The first/second subpixel electrodes 191a/191b are connected to the first/second drain electrodes 175a/175b through the first/second contact holes 185a/185b and receive data voltages Vd from the first/second drain electrodes 175a/175b. The third subpixel electrode 191c is applied with the common voltage Vcom through the third and fourth contact holes 187 and 188.

Also, the second subpixel electrode 191b is connected to the fourth source electrode 173d through the contact hole 186, and the third subpixel electrode 191c is connected to the third drain electrode 175c through the contact hole 185c and is connected to the fourth drain electrode 175d through the contact hole 185d.

The first/second/third subpixel electrodes 191a/191b/191c applied with the data voltages Vd and the common voltage Vcom, and the common electrode 270 of the common electrode panel 200, generate an electric field that determines the orientations of liquid crystal molecules of the liquid crystal layer 3 between two electrodes 191 and 270. Accordingly, the luminance of the light transmitted through the liquid crystal layer 3 differs depending on the thusly determined orientation of the liquid crystal molecules. The first to third subpixel electrodes 191a-c and the common electrode 270 form the liquid crystal capacitors Clca, Clcb, and Clcc, thereby maintaining the voltage after the thin film transistors are turned off.

The first to third subpixel electrodes 191a-c and the storage electrode line 131 including the storage electrode 137 respectively form the storage capacitors Csta, Cstb, and Cstc, and the storage capacitors Csta, Cstb, and Cstc enhance the voltage-maintaining capacity of the liquid crystal capacitors Clca, Clcb, and Clcc.

Also, the first to third subpixel electrodes 191a-c may include a plurality of cutouts (not shown). The edges of the cutouts distort the electric field, and form a horizontal component that determines an inclined direction of the liquid crystal molecules. The directions that the liquid crystal molecules 30 are inclined are varied according to the shape of the cutouts such that the viewing angle of the liquid crystal display is widened by varying the inclined directions of the liquid crystal molecules.

The contact assistants 81 and 82 are connected to the end portions 129 of the gate lines 121 and the end portions 179 of the data lines 171 through the contact holes 181 and 182, respectively. The contact assistants 81 and 82 enhance adhesion of the end portions 129 of the gate lines 121 and the end portions 179 of the data lines 171 to external devices, and protect them.

The connecting member 83 electrically connects the storage electrode 137 to the third subpixel electrode 191c.

An alignment layer 11 is formed on the pixel electrodes 191, the contact assistants 81 and 82, and the passivation layer 180.

Now, the upper panel 200 will be described.

A light blocking member 220 is formed on an insulation substrate 210. The light blocking member 220 is referred to as a black matrix, and prevents light leakage.

A plurality of color filters 230 are also formed on the substrate 210. Most of the color filters 230 exist in the region surrounded by the light blocking member 220, and can extend long in the longitudinal direction along the column of the pixel electrode 191. Each of the color filters 230 can display one of the primary colors such as three primary colors of red, green, and blue.

An overcoat 250 is formed on the color filters 230 and the light blocking member 220. A common electrode 270 is formed on the overcoat 250. An alignment layer 21 is formed on the common electrode 270.

The liquid crystal layer 3 has negative dielectric anisotropy, and the liquid crystal molecules of the liquid crystal layer 3 may be aligned so that a major axis thereof is perpendicular to the surface of the two display panels in the absence of an electric field.

The operation of the LCD according to one exemplary embodiment of the present invention will be described hereinafter with reference to FIG. 7.

Figure 7:
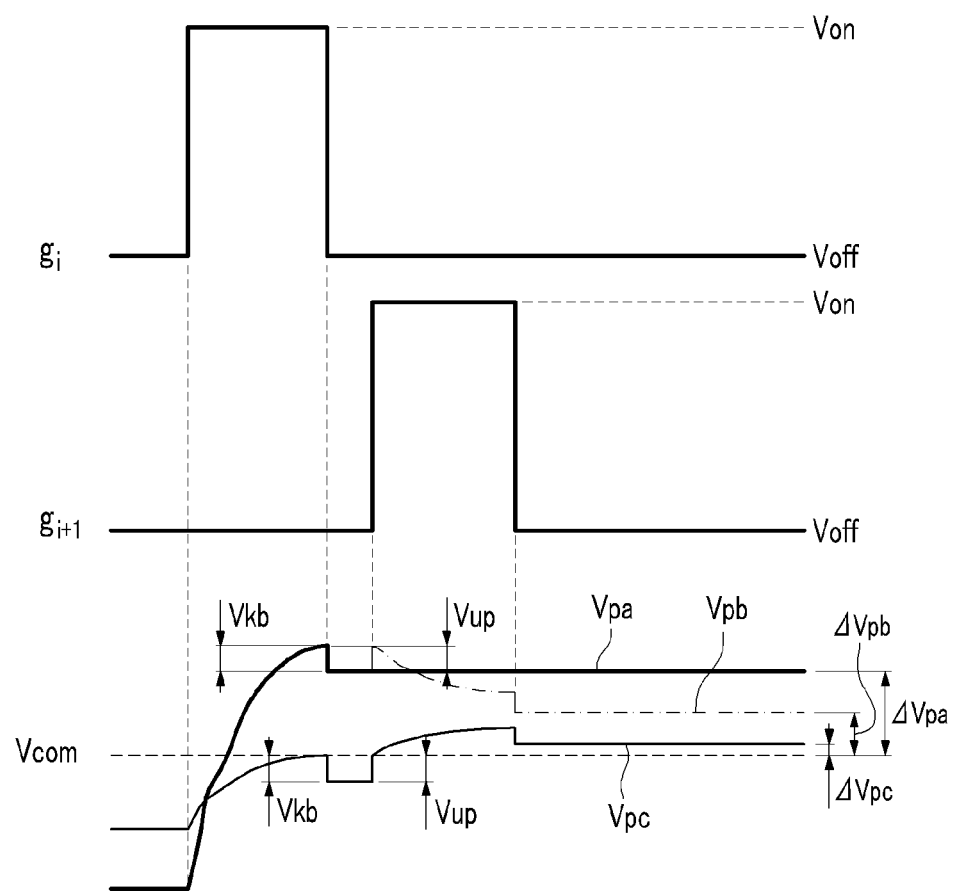
FIG. 7 is a waveform diagram of a driving voltage of a liquid crystal display according to an exemplary embodiment of the present invention.

FIG. 7 is a waveform diagram of a driving voltage of a liquid crystal display according to an exemplary embodiment of the present invention.

Referring first to FIG. 1, the signal controller 600 receives input image signals R, G, and B and input control signals for controlling the display, from an external graphics controller (not shown). The input image signals R, G, and B involve luminance information of each pixel PX, and the luminance has a predetermined number of grays, for example $1024=2^{10}$, $256=2^8$, or $64=2^6$. Examples of the input control signals are a vertical synchronization signal Vsync, a horizontal synchronizing signal Hsync, a main clock signal MCLK, and a data enable signal DE.

The signal controller 600 properly processes the input image signals R, G, and B to match operating conditions of the liquid crystal panel assembly 300 based on the input image signals R, G, and B and the input control signals. Moreover, the signal controller 600 generates a gate control signal CONT1 and a data control signal CONT2, sends the gate control signal CONT1 to the gate driver 400, and sends the data control signal CONT2 and the processed image signal DAT to the data driver 500. The output image signal DAT as a digital signal has a value (or gray) of a predetermined number.

The data driver 500 receives the digital image signal DAT for the pixel PX of one row according to the data control signal CONT2 generated by the signal controller 600, and selects a gray voltage corresponding to each digital image signal DAT. Then, the data driver 500 converts the digital image signal DAT into an analog data voltage to apply the converted digital image signal to a relevant data line DL.

The gate driver 400 applies a gate-on voltage Von to the gate lines $GL_i$ and $GL_{i+1}$ according to the gate control signal CONT1 generated by the signal controller 600 to turn on the switching elements Qa, Qb, Qc, and Qd connected to the gate lines $GL_i$ and $GL_{i+1}$. In this case, a data voltage Vd applied to the data line DL is applied to the relevant pixel PX through the turned-on first and second switching elements Qa and Qb.

A specific pixel row, for example focusing on the i-th pixel row, will be described below with reference to FIG. 7.

The first gate signal is applied to the first gate line $GL_i$ of the i-th row. If the first gate signal is changed from the gate-off voltage Voff to the gate-on voltage Von, the first, second, and third switching elements Qa, Qb, and Qc connected thereto are turned on. Accordingly, the data voltage Vd applied to the data line DL is applied to the first and second subpixel electrodes 191a and 191b through the turned-on first and second switching elements Qa and Qb. The common voltage Vcom applied to the storage electrode line SL is transmitted to the third subpixel electrode 191c through the turned-on third switching element Qc. Here, the same data voltage Vd is applied to the first and second subpixel electrodes PEa and PEb. The first and second liquid crystal capacitors Clca and Clcb are charged with the same value as a difference between the common voltage Vcom and the data voltage Vd, and the voltage charged to the third liquid crystal capacitor Clcc become 0.

Then, when the first gate signal $g_i$ is changed to the gate-off voltage Voff from the gate-on voltage Von, the first, second, and third switching elements Qa, Qb, and Qc are turned off, and the voltages Vpa, Vpb, and Vpc of the first, second, and third subpixel electrodes are decreased by the kick-back voltage Vkb by the influence. Then, when the second gate signal $g_{i+1}$ is changed to the gate-on voltage Von from the gate-off voltage Voff, the fourth switching element Qd is turned on, and the voltages Vpb and Vpc of the second and third subpixel electrodes are increased by the increasing voltage Vup. If the fourth switching element Qd is turned on, electrical charges move from the second subpixel electrode 191b to the third subpixel electrode 191c through the fourth switching element Qd. Thus, the voltage Vpb of the second subpixel electrode is decreased, and the voltage Vpc of the third subpixel electrode is increased. Accordingly, each charged voltages Δ Vpa, Δ Vpb, and Δ Vpc of the first, second, and third liquid crystal capacitors Clca, Clcb, and Clcc become different from each other, and the relation of the magnitude thereof is as follows.

$$\Delta Vpa > \Delta Vpb > \Delta Vpc$$

At this time, the charging voltages Δ Vpa, Δ Vpb, and Δ Vpc of the liquid crystal capacitor Clca, Clcb, and Clcc show different gamma curves, and the gamma curve of one pixel voltage is a curved line that is synthesized from these different gamma curves. The synthetic gamma curve in the front should be corrected so as to conform to the most suitable reference gamma curve in the front, and the synthetic gamma curve in the side should be corrected so as to be extremely close to the reference gamma curve in the front. As described above, due to conversion of the image data, side visibility is improved. As described above, if the gamma curve of the pixel electrode 191 is controlled according to three gamma curves, side visibility is further effectively improved.

By repeating the above procedure by a unit of one horizontal period which is denoted by "1H" and is equal to one period of a horizontal synchronizing signal Hsync and a data enable signal DE, a data voltage Vd is applied to all pixels PXs to display an image of one frame.

When the next frame starts after finishing one frame, the state of an inversion signal RVS applied to the data driver 500 is controlled such that the polarity of the data voltage Vd applied to each pixel PX is opposite to that of the previous frame.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A driving method of a liquid crystal display comprising a first liquid crystal capacitor, a second liquid crystal capacitor, and a third liquid crystal capacitor, the driving method comprising:
   charging the first liquid crystal capacitor and the second liquid crystal capacitor with a same data voltage according to a first gate signal that switches on a first switching element that is connected to the first liquid crystal capacitor and a second switching element that is connected to the second liquid crystal capacitor;
   charging a common voltage to the third liquid crystal capacitor according to the first gate signal that switches on a third switching element, wherein a source of the third switching element is directly connected to a storage line that provides the common voltage and a drain of the third switching element is directly connected to the third liquid crystal capacitor; and
   decreasing a charging voltage of the second liquid crystal capacitor and increasing a charging voltage of the third liquid crystal capacitor, according to a second gate signal.

2. The driving method of claim 1, wherein a charging voltage of the first liquid crystal capacitor is higher than a charging voltage of the second liquid crystal capacitor, and wherein the charging voltage of the second liquid crystal capacitor is higher than a charging voltage of the third liquid crystal capacitor after decreasing the charging voltage of the second liquid crystal capacitor and increasing the charging voltage of the third liquid crystal capacitor.

3. The driving method of claim 2, wherein the charging of the first liquid crystal capacitor and the second liquid crystal capacitor with the same data voltage and the charging of the common voltage to the third liquid crystal capacitor are simultaneously executed.

4. The driving method of claim 1, further comprising:
applying the first gate signal to a first gate line of an i-th row; and
applying the second gate signal to a second gate line of an (i+1)-th row.

5. The driving method of claim 4, wherein the first gate line and the second gate line are adjacent to each other.

6. The driving method of claim 1, further comprising:
applying the same data voltage to a source of the first switching element and to a source of the second switching element via a data line.

7. The driving method of claim 6, wherein the same data voltage is determined by a difference between the common voltage and a data voltage applied to the data line.

8. The driving method of claim 1, wherein the same data voltage is higher than the common voltage.

9. The driving method of claim 1, wherein the common voltage charged to the third liquid crystal capacitor is zero.

10. The driving method of claim 1, further comprising:
generating gamma curves from charging voltages of the first liquid crystal capacitor, the second liquid crystal capacitor, and the third liquid crystal capacitor; and
generating a synthetic gamma curve by synthesizing the gamma curves.

* * * * *